United States Patent [19]

Kohno et al.

[11] Patent Number: 5,021,812
[45] Date of Patent: Jun. 4, 1991

[54] CAMERA SYSTEM

[75] Inventors: Takahiro Kohno; Hitoshi Narita, both of Kanagawa, Japan

[73] Assignee: Canon Kabushiki Kaisha, Tokyo, Japan

[21] Appl. No.: 419,729

[22] Filed: Oct. 11, 1989

[30] Foreign Application Priority Data

Oct. 13, 1988 [JP] Japan ................... 63-259198

[51] Int. Cl.$^5$ ............. G03B 29/00; G03B 17/00; H04N 5/30; H04N 5/66
[52] U.S. Cl. ................... 354/76; 354/286; 358/209; 358/170; 358/230
[58] Field of Search ............ 354/76, 286; 358/209, 358/170, 230

[56] References Cited

U.S. PATENT DOCUMENTS

| | | | |
|---|---|---|---|
| 4,853,725 | 8/1989 | Matsuda | 354/286 |
| 4,860,108 | 8/1989 | Saito | 358/209 |
| 4,901,152 | 2/1990 | Hieda | 358/209 |
| 4,924,249 | 5/1990 | Aihara et al. | 354/286 |

FOREIGN PATENT DOCUMENTS

| | | |
|---|---|---|
| 3241957A1 | 5/1983 | Fed. Rep. of Germany . |
| 3744342A1 | 7/1988 | Fed. Rep. of Germany . |
| 2070264A | 2/1981 | United Kingdom . |
| 2158957 | 4/1985 | United Kingdom . |

Primary Examiner—L. T. Hix
Assistant Examiner—Jae N. Noh
Attorney, Agent, or Firm—Fitzpatrick, Cella, Harper & Scinto

[57] ABSTRACT

A camera system comprises a camera body and an optical accessory which are detachably coupled with each other through their mounts by rotating them around an optical axis relative to each other. Each of the camera body and the optical accessory has a group of electric connection terminals. Each group is aligned approximately around the optical axis and arranged to come into contact with the other group when the mounts are coupled with each other by rotating them. The height in their contacting direction of each group of terminals is arranged to have a stepped difference at least by one step. At least one of the two groups of connection terminals is arranged to be movable in the contacting direction and to be elastically urged to move in that direction. Among each of said groups of connection terminals, a plurality of power supply connection terminals are disposed away from each other with other connection terminals which are provided for data communication disposed between the power supply terminals. The stepped difference is provided for one of the power supply terminals located in the rear of each group by setting back its height in the contacting direction from the height of all the communication terminals and that of the other power supply terminal.

71 Claims, 6 Drawing Sheets

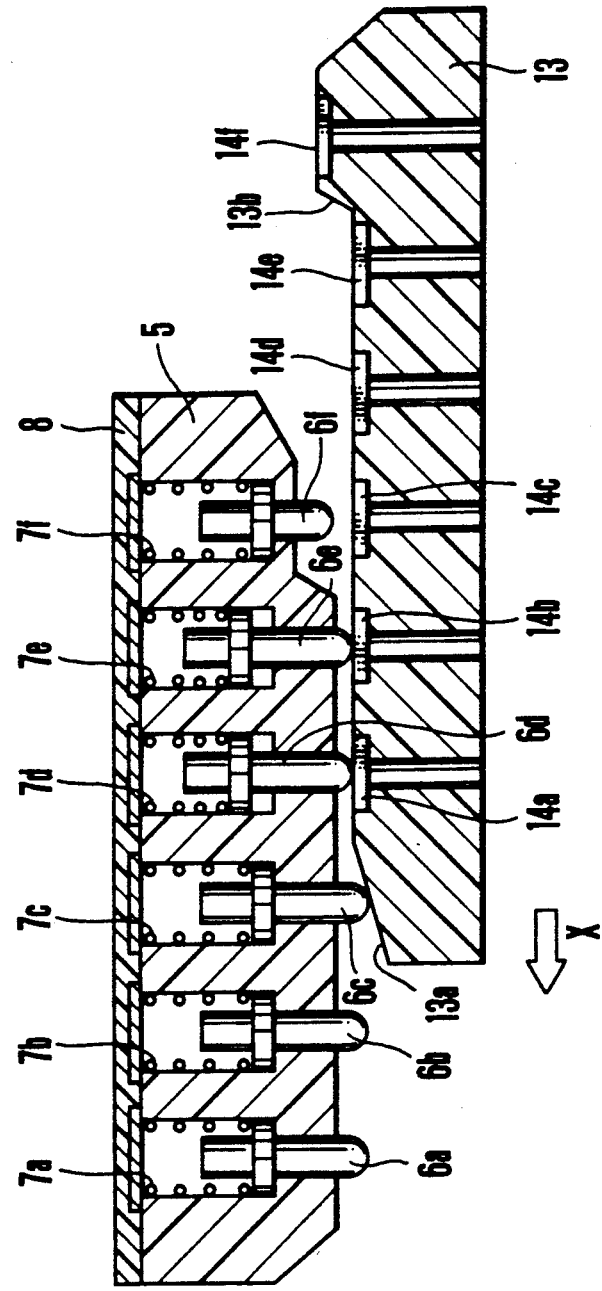

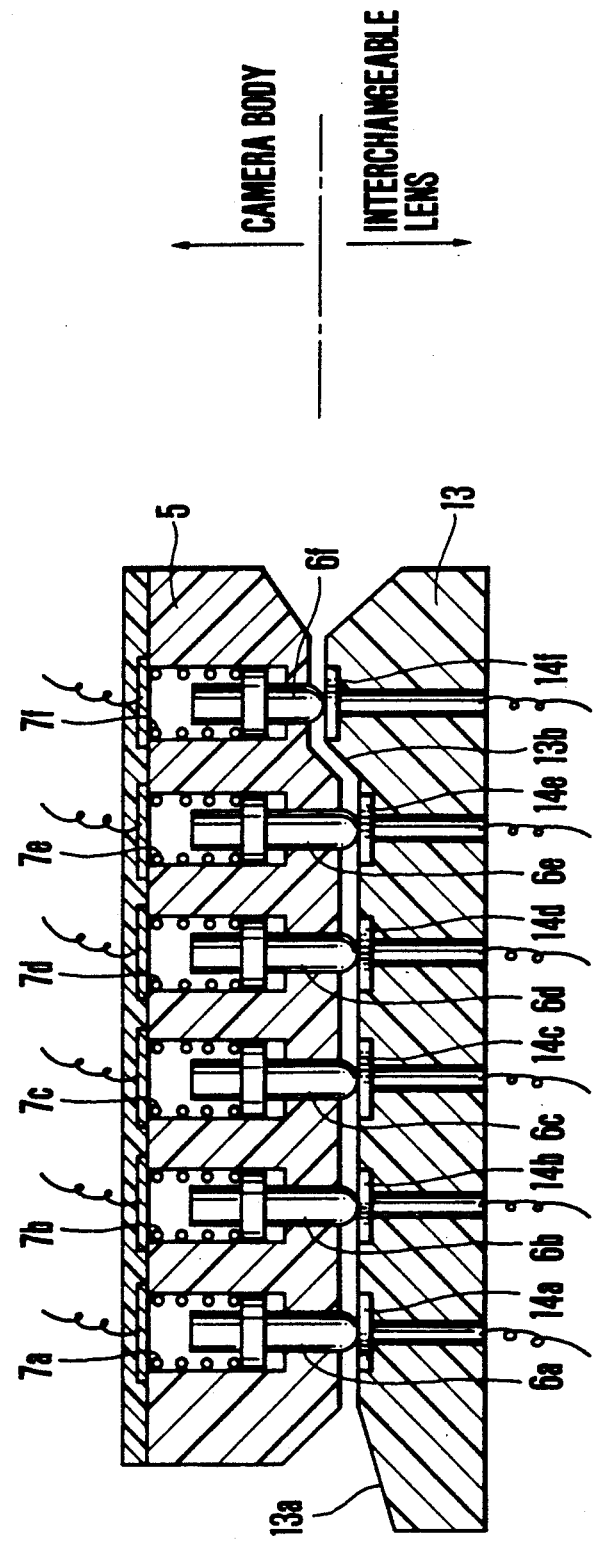

CAMERA SYSTEM

BACKGROUND OF THE INVENTION

1. Field of the Invention

This invention relates to a camera body, an optical accessory or a camera system.

2. Description of the Related Art:

Camera systems of the kind having optical accessories such as an interchangeable lens, an intermediate tube, various converters, etc. detachably mounted on a camera body by a bayonet mount device have been known.

The application of electronics to camera systems has advanced during recent years. As a result, communication and power supply arrangement have become necessary between the camera body and the optical accessory. To meet this requirement, camera systems of varied kinds have been proposed. They have electric connection terminals such as contact pins or the like arranged on both the optical accessory and the camera body. The arrangement is such that: The terminals arranged on both sides come into contact with each other when the optical accessory is mounted on the camera body by rotating the mounts of both sides relative to each other. With the optical accessory mounted, the camera body supplies electric energy to the optical accessory and reads the content of a ROM included in the optical accessory.

An arrangement to minimize wear due to sliding contact between the electric connection terminals of the camera body and those of the optical accessory has been proposed as disclosed in U.S. patent applications Ser. No. 016,653 filed on Feb. 19, 1987 and Ser. No. 136,976 filed on Dec. 23, 1987. In accordance with the proposed arrangement, the electric connection terminals of the two are provided with stepped differences in level which are formed to lessen the number of tires of the sliding contact for minimal wear in the direction of their contact when the two mounts are rotated for mounting.

In the case of the above arrangement, two connection terminals (a high potential terminal and a grounding terminal) and a plurality of connection terminals for communication are arranged stepwise to have different heights in the contact direction As a result, two connection terminals for power supply are adjacently disposed. The arrangement presents no problem as long as the power supply is effected from the camera body to the optical accessory after detection of completion of the mounting action of the two mounts. However, in cases where the electric energy is arranged to be constantly supplied from the camera body side, the two adjacent power supply terminals might be short-circuited if, for example, a metal piece is inadvertently brought near to them. In such a case, circuits disposed on the side of the camera body might be broken.

SUMMARY OF THE INVENTION

One aspect of this invention lies in the provision of a camera body, an optical accessory or a camera system, wherein a plurality of electric connection terminals for power supply are arranged away from each other and yet electrical connection terminals are arranged to have stepped heights in the contacting direction, so that the problems relative to wear and short-circuiting can be solved.

BRIEF DESCRIPTION OF THE DRAWINGS

FIGS. 4(a), 4(b) and 4(c) are enlarged sectional views showing the rotatory mounting movement of the mount parts.

DETAILED DESCRIPTION OF THE PREFERRED EMBODIMENT

Figure 1:
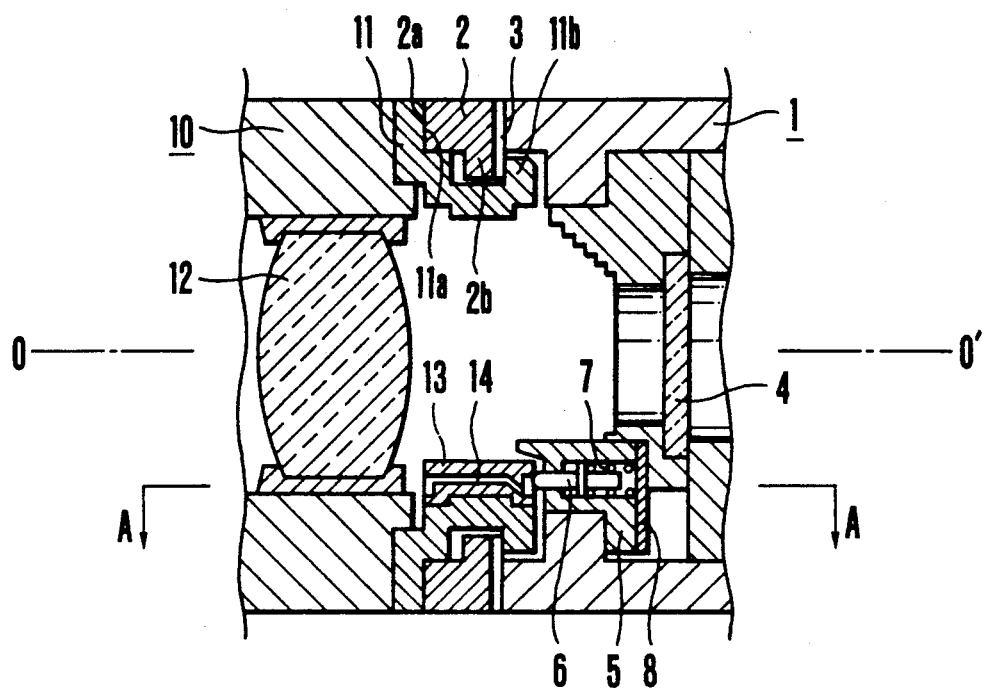
FIG. 1 is a sectional view of an embodiment of this invention showing a camera body and an interchangeable lens as in a state of having the latter mounted on the former.
Figure 2:
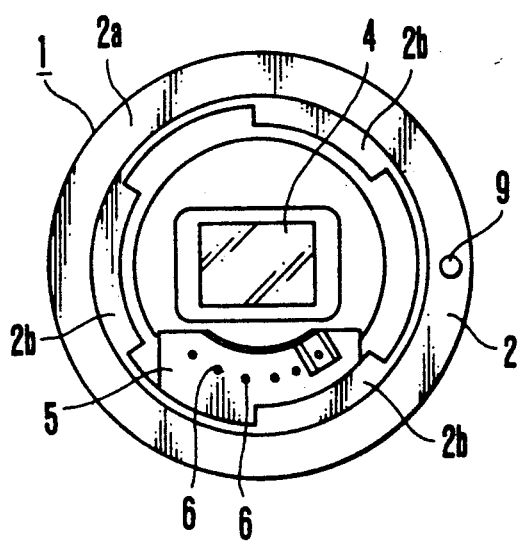
FIG. 2 is a plan view showing the camera body as viewed from its mount part.
Figure 3:
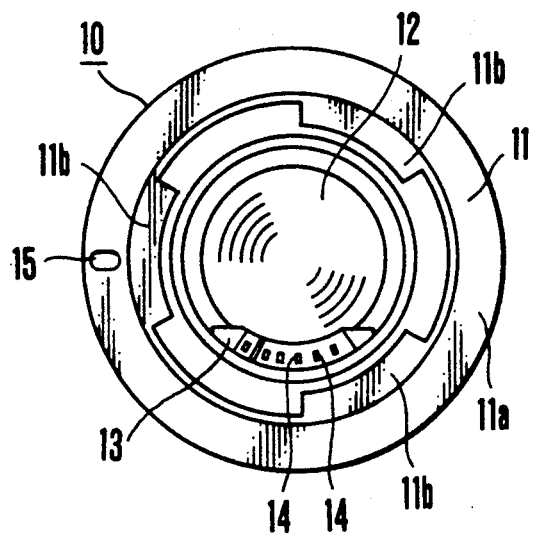
FIG. 3 is a plan view showing the interchangeable lens as viewed from its mount part.

FIGS. 1 to 4(c) show a video camera system to which this invention is applied. The illustrations include a video camera body 1; a camera mount 2 which is of a rotatory bayonet mounting type and is fixedly secured to the video camera body 1, the mount 2 being provided with a mount colliding face 2a which serves as a datum in the optical axis direction and three mount claws 2b; a leaf spring 3 which is arranged to abut on the mount claws of a lens mount and to bring the camera mount 2 and the lens mount into tight contact with each other; an optical filter 4; and a camera-side contact holder 5; and camera-side contacts 6 which serve as electric connection terminals and are carried by the camera-side contact holder 5 in such a way as to be movable in the optical axis direction O-O', the contacts 6 including a total of six contacts 6a to 6f. Conductive springs 7 are made of a conductive material including a total of six springs 7a to 7f, which are arranged to elastically urge the camera-side contacts 6a to 6f in the contacting direction. A printed circuit board 8 is electrically connected via the springs 7a to 7f to the camera-side contacts 6a to 6f. The board 8 has patterns formed thereon in positions corresponding to the camera-side contacts 6a to 6f (and the springs 7a to 7f). A lock pin 9 is arranged to be retractable from its position protruding from the mount colliding face 2a and to permit locking and unlocking, by means of an operation member which is not shown, in mounting and dismounting an interchangeable lens 10. The lens 10 is employed as an optical accessory. A bayonet mount type lens mount 11 is secured to the interchangeable lens 10 and is arranged to permit the lens 10 to be mounted on the camera body 1 by rotating it. The lens mount 11 is provided with a mount colliding face 11a which serves as a datum in the optical axis direction and three mount claws 11b. The illustrations further include an image forming lens 12; a lens-side contact holder 13; and lens-side contacts 14 including a total of six contacts 14a to 14f which are secured to (inserted in) the lens-side contact holder 13 as electric connection terminals and come into contact with the camera-side contacts 6a to 6f when the two mounts 2 and 11 are coupled by rotating them relative to each other. A lock slot 15 is arranged to allow the lock pin 9 to come into it for locking when the two mounts 2 and 11 are coupled. Further, the center point of the camera-side contacts 6a to 6f is located about 90 degrees away from the lock pin 9 round the optical axis. Meanwhile, the center point of the lens-side contacts 14a to 14f is located to be about 90 degrees away from the lock slot 15 around the optical axis.

Figure 4A:
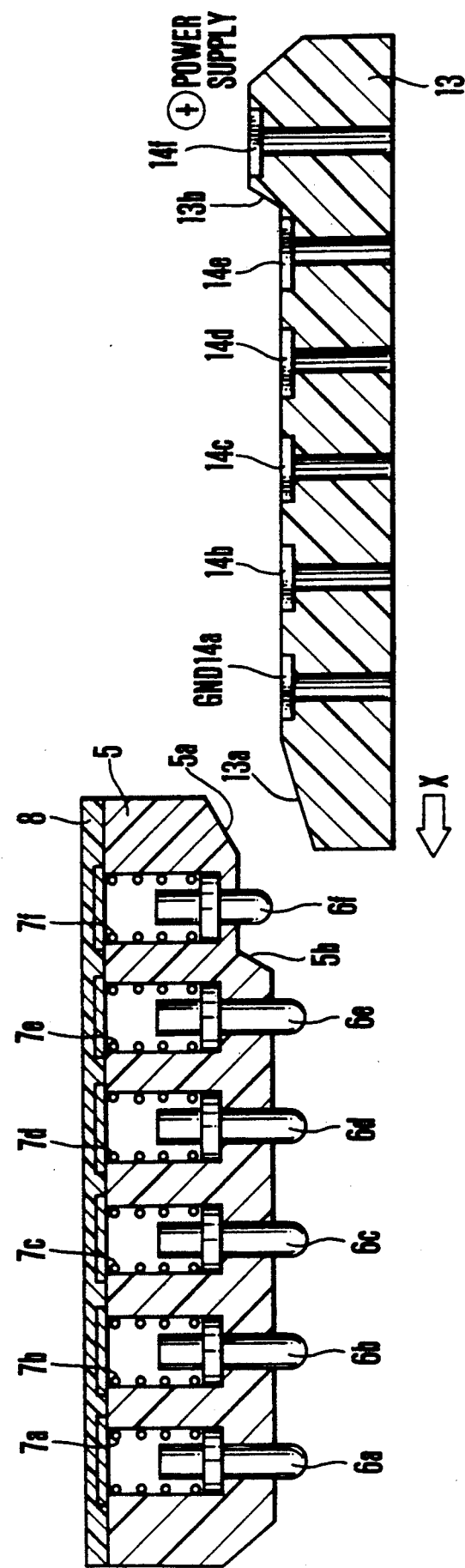

Referring to FIGS. 4(a). 4(b) and 4(c), the features and the operation of the embodiment are as follows: In the case of the embodiment, the camera-side contacts 6a and 6f relate to the power supply. More specifically, the camera-side contact 6a is provided for grounding while the other contact 6f is for a high potential. Other camera-side contacts 6b to 6e are for communication with the lens side. They are provided with a clock signal line, a camera-to-lens transmission line and a lens-to-camera transmission line. The camera-side contact 6f (one of the power supply contacts) is set back (toward the image sensor) alone from the other contacts 6a to 6e in the contacting direction (in the optical axis direction O-O' as shown in FIG. 1) to have a lower height than others. This state is as shown in FIG. 4(a) which shows these contacts before mounting. Further, the springs 7a and 7f which urge the power-supply related camera-side contacts 6a and 6f are arranged to have a larger urging force than that of the other springs 7b to 7e. This is for the purpose of reducing contact resistance by allowing these power supply contacts 6a and 6f to have a greater contact pressure on the lens-side power supply contacts 14a and 14f than the contact pressure of the other contacts 6b to 6e on the lens-side contacts 14b to 14e. Generally, in terms of design work, the maximum allowable contact resistance of power supply contacts provided for a motor or the like differs from that of contacts for communication (or for IC parts). For example, if the contact resistance allowable for the power supply contacts is less than 0.1 ohm, the contact resistance allowable for the communication contacts is less than 1 ohm.

FIG. 4(b) shows these contacts as in the process of mounting. As shown, the camera-side contact 6f is arranged to be shorter in height and to protrude forward to a less extent than the other lens-side contacts 6a to 6e in the optical axis direction. This ensures that, during the mounting process, the contact 6f never comes into contact with any of the lens-side contacts 14a to 14e which are not corresponding to the contact 6f. Meanwhile, the lens-side contact 14f which corresponds to the camera-side contact 6f is arranged to be higher (protruding further forward in the direction of the optical axis) than the other lens-side contacts 14a to 14e. The arrangement is such that the lens-side contact 14f comes into contact with the camera-side contact 6f at the last stage of the rotatory mounting process. Other camera-side contacts 6a to 6e come into contact with corresponding lens-side contacts 14a to 14e at the last stage of the rotatory mounting process, respectively. In other words, the contact 6a comes into contact with the contact 14a, the contact 6b with the contact 14b, the contact 6c with the contact 14c, the contact 6d with the contact 14d and the contact 6e with the contact 14e as shown in FIG. 4(c).

The rotatory mounting process of the embodiment is as follows: Referring to FIG. 4(a) which shows the mounting process as in its initial stage. Under this condition, the camera-side contacts 6a to 6f are not in contact with any of the lens-side contacts 14a to 14f.

When the interchangeable lens 10 is rotated to move the lens-side contact holder 13 from the state of FIG. 4(a) in the direction of arrow X to a position as shown in FIG. 4(b), the camera-side contacts 6e and 6d ride on a slanting face 13a formed on the camera-side contact holder 13 and slide over the face of the contact holder 13 which is arranged to be at the same height as, that is, flush with the contacts 14a to 14e. FIG. 4(b) shows this intermediate state of the rotatory mounting process.

FIG. 4(c) shows the rotatory mounting process as in its completed state, which is obtained by rotating the interchangeable lens 10 to move the lens-side contact holder 13 further in the direction of arrow X. Under this condition, the lens-side contacts are all in contact with their corresponding camera-side contacts.

More specifically stated, the camera-side contact 6f is out of contact with (not sliding over) any of the lens-side contacts 14a to 14e when it comes to confront them during the intermediate stage of the mounting process. At the last stage of the mounting process, the contact 6f rides on a slanting face 13b of the lens-side contact holder 13 to come into contact with the lens-side contact 14f. The camera-side contact 6e rides on the slanting face 13a of the lens-side to come to slide over the lens-side contacts 14a to 14d before it comes into contact with the corresponding lens-side contact 14e. The camera-side contact 6d likewise rides on the slanting face 13a to slide over the lens-side contacts 14a to 14c until it comes into contact with the lens-side contact 14d. Following this, the camera-side contact 6c rides on the slanting face 13a to slide over the lens-side contacts 14a and 14b until it comes into contact with the lens-side contact 14c. The camera-side contact 6b also rides on the slanting face 13a to slide over the lens-side contact 14a before it comes into contact with the lens-side contact 14b. The camera-side contact 6a lastly rides on the slanting face 13a to come into contact with the lens-side contact 14a. An important feature of the embodiment lies in that the contacts 6a and 6f which have a greater contact pressure than the other camera-side contacts are arranged to come into sliding contact with the corresponding lens-side contacts only once respectively. This not only reduces the contact resistance of the power-supply related contacts but also eliminates the possibility of an adverse effect, such as wear, on the lens-side contacts 14b to 14e that otherwise would result from sliding contact with them under the greater contact pressure. Further, since the power-supply related camera-side contacts 6a and 6f never come into slide contact with the communication-related lens-side contacts 14b to 14e during the rotatory mounting process, any circuit that is arranged inside the interchangeable lens 10 never be electrically broken by them. Besides, the invented contact arrangement reduces the wear of contacts by lessening the sliding contact frequency of the camera-side contacts 6a to 6f and the lens-side contacts 14a to 14f as a whole. A further advantage resides in that: Since the power-supply related contacts 6a and 6f (and 14a and 14f) are separated from each other and disposed at different heights at the two ends of the contact group, the arrangement has little possibility of short-circuit due to any inadvertent approach of a conductive matter.

The advantages are attributable first to that the camera-side contact 6f and the lens-side contact 14f which are disposed at the trailing end in the rotatory mounting direction of the interchangeable lens 10 are arranged in the stepped states, i.e., set back from the other contacts in the contacting direction. If not, the camera-side contact 6f would come into sliding contact with all the lens-side contacts. The advantages are attributable secondly to that the power-supply related contacts 6a and 6f (and 14a and 14f) are arranged away from each other and disposed in the two end parts of the alignment of the communication contacts 6b to 6e (and 14b to 14e) with the power-supply contacts arranged to have higher contact pressure than the other contacts.

Further, the slanting face 13b of the lens-side contact holder 13 is arranged to have a larger angle of inclination than the other slanting face 13a in such a way as to prevent the spaces between the contacts 14e and 14f and between the contacts 6f and 6e from becoming too wide.

Figure 5:
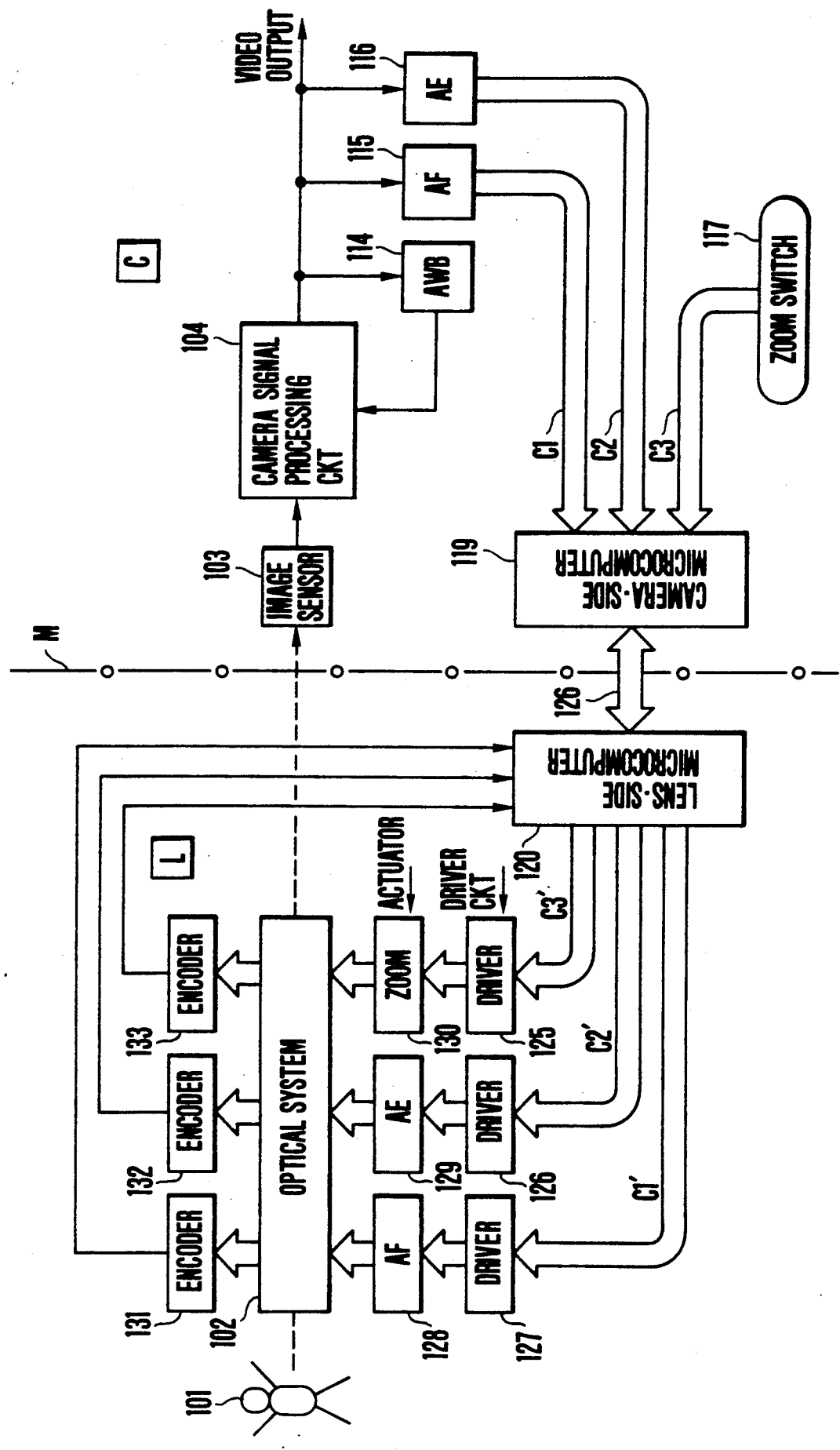
FIG. 5 is a block diagram showing the circuit arrangement of a camera system arranged as an embodiment of this invention.

Next, referring to FIG. 5, the circuit arrangement of a lens-interchangeable camera-incorporating type VTR which is arranged in accordance with this invention is as follows: In FIG. 5, a camera unit C is shown on the right side and a lens unit L on the left side of a one-dot chain line which is vertically drawn in the middle part to represent a mount part M.

A light flux coming from an object 101 is imaged through a lens optical system 102 on the image sensing plane of an image sensor 103. The image is photo-electric converted by the image sensor 103 and is produced as an image signal. The image signal is converted into a TV signal by a camera signal processing circuit 104. The TV signal is supplied to an automatic white balance adjustment circuit 114 (hereinafter referred to as AWB circuit), an automatic focusing circuit 115 (hereinafter referred to as AF circuit), an automatic exposure control circuit 116 (hereinafter referred to as AE circuit), etc..

These automatic control circuits including the AWB circuit 114, the AF circuit 115 and the AE circuit 116 produce control signals of varied kinds. These control signals are respectively supplied to the applicable controlled systems. The control signal output from the AWB circuit 114 to be used for color balance adjustment in carrying out a camera signal processing action is supplied to the camera signal processing circuit 104. Meanwhile, control signals C1 and C2 output from the AF circuit 115 and the AE circuit 116 are supplied to a microcomputer 119 which is disposed on the side of the camera unit C.

A zoom switch 117 which is provided for setting the focal length of the optical system is arranged to produce a control signal C3. The control signal C3 is also supplied to the camera-side microcomputer 119.

Communication data including the above-stated control signals is sent out from the camera unit C to the lens unit L through a communication line 126 which is formed jointly by the electric contact groups disposed at the mounts as mentioned in the foregoing.

The data communication line 126 is connected to a lens-side microcomputer 120. All the communication data is first received by the lens-side microcomputer 120. The various control signals C1, C2 and C3 which have been supplied to the camera-side microcomputer 119 are thus transmitted via the data communication line 126 (the contacts 6b to 6e and 14b to 14e ) to the lens-side microcomputer 120. The data thus transmitted are converted into control variables C1', C2' and C3' suited for the systems to be controlled. These control variables C1', C2' and C3' are then supplied respectively to an AF driver circuit 127, an AE driver circuit 126 and a zoom driver circuit 125. As a result, the optical system 102 is controlled by actuators 128, 129 and 130 accordingly. Further, the optical system 102 is provided with encoders 131, 132 and 133 for the purpose of confirming the operating states of these actuators.

The encoder 131 is provided for detecting a focal point; the encoder 132 for detecting an aperture position; and the encoder 133 for detecting information on a focal length obtained by the zooming operation. Data indicating the results of detection thus obtained is sent to the lens-side microcomputer 120. The data from these encoders is not only used for control over the lens but is also sent, as necessary, to the camera-side microcomputer 119 to be used for AF and AE actions of the camera unit C.

Figure 6:
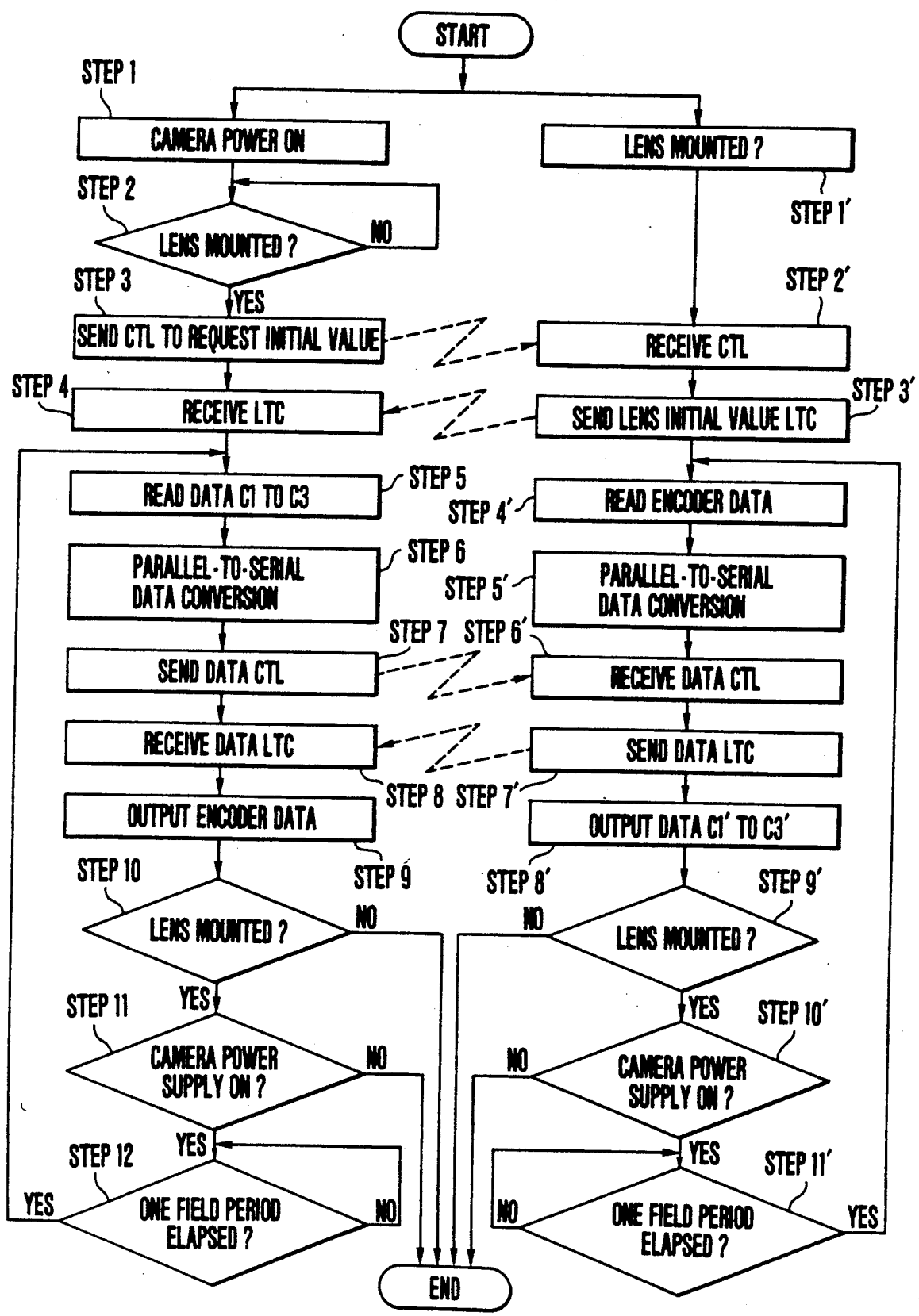
FIG. 6 is a flow chart showing the operation of the circuit arrangement of FIG. 5.

Referring to FIG. 6 which is a flow chart, the operation of the circuit arrangement of FIG. 5 is as follows: Step 1: The power supply of the camera unit C is switched on. Step 2: The camera-side microcomputer 119 makes a check as to whether the lens unit L is mounted on the camera unit C. Step 3: A request for transmission of the initial data about the lens unit is sent out via the data transmission line 126. After that, the flow comes to a step 4. At the step 4: The initial data of varied kinds including the kind of the lens unit in use, etc. is received from the lens unit. Step 5: The camera-side microcomputer 119 reads the above-stated various data C1, C2 and C3. Step 6: These data inputs are parallel-to-serial converted into data CTL. Step 7: The data CTL thus obtained is sent out to the lens unit L.

At step 8: Data LTC which is of varied kinds including information on the results of detection made by the encoders are received from the lens unit. Step 9: Various control actions are performed by selecting the encoder data. After that, the flow comes to a step 10. At the step 10: A check is made for the presence of the lens unit. If the lens unit is found to be mounted on the camera unit, the flow comes to a step 11 to find if the camera power supply is switched on. If so, the flow comes to a step 12. At the step 12: The flow awaits the lapse of one field period. After that the flow comes back to the step for reading the data C1 to C3. This routine comes to an end either if the lens unit is dismounted or if the camera power supply is switched off.

Meanwhile, the operation performed on the side of the lens unit L is as follows: At a step 1': The lens unit L is mounted on the camera unit C. Step 2': The request CTL for the initial data is received from the camera unit. Step 3': The initial data for the lens unit is sent out as data LTC to the camera. At the step 3', the initial data or values are read out from a ROM or the like connected to the lens-side microcomputer 120 and are parallel-to-serial converted into the data LTC, so that the data LTC is sent out to the camera unit.

Step 4': The lens-side microcomputer 120 reads the detection data of the encoders 131, 132 and 133 which detect the state of the lens unit. Step 5': The data is parallel-to-serial converted. Step 6': The data CTL is received from the camera unit. Step 7': The data LTC is sent out to the camera unit. Step 8': The data of varied kinds C1', C2' and C3' which are obtained at the steps 4' and 5' are produced. Steps 9', 10' and 11': If the lens unit still remains mounted on the camera unit and if the camera power supply is still on, the flow awaits the lapse of one field period. After that, again the lens-side microcomputer 120 reads the detection data of the encoders. If the lens unit is dismounted or if the camera power supply is switched off, the flow of this routine comes to an end.

The control data of varied kinds are thus communicated between the camera unit and the lens unit and various parts are controlled accordingly.

For example, the AF control signal C1' is supplied to the driver circuit 127. Then, in accordance with the output of the driver circuit 127, the actuator 128 which is provided for automatic focusing (AF) controls and adjusts the position of the optical system 102 in such a way as to obtain an in-focus state. Further, the AE (automatic exposure) control signal C2' is supplied to the driver circuit 126. Then, in accordance with the output of the driver circuit 126, the AE actuator 129 controls the optical system 102 to adjust its aperture to an optimum aperture position Further, the zoom control signal C3' is supplied to the driver circuit 125. In response to the output of the driver circuit 125, the zooming actuator 130 controls and adjusts the position of the optical system 102 to obtain a focal length designated by the output of the driver circuit 125.

In the case of the embodiment described, the camera-side contact 6f is arranged to be in a stepped or set-back position to be out of sliding contact with the lens-side contacts 14a to 14e during the rotatory mounting process. However, the fundamental advantages of the invention is attainable also even if the contact 6f is allowed to slide over these contacts as long as the contact pressure of the contact 6f is sufficiently lessened by setting it in a stepped or set-back position. Such modification of course comes within the spirit and scope of this invention.

Further, while the stepped height alignment of contacts is arranged to have only one step in the case of the embodiment described, the number of steps may be increased to two or more than two steps. The arrangement employed in the embodiment is advantageous in terms of reduction in space in the direction of the optical axis.

While the power-supply related pairs of contacts 6a and 6f and 14a and 14f are disposed at the ends of the contact alignment, the invention is not limited to this arrangement. The advantages of the invention is attainable also by changing the contact arrangement. For example, some standby contacts or communication contacts may be arranged further on the left side of the one-end contacts 6a and 14a as viewed on FIG. 4. Such a change also of course comes within the scope of this invention.

The embodiment representing one aspect of this invention is arranged, as described in the foregoing, to reduce the wear of contacts by lessening the sliding movement between contacts during the rotatory mounting process; to reduce the contact resistance of the contacts related to the power supply to lessen the possibility of insufficient continuity; and to be capable of effectively preventing the power-supply related contacts from short-circuiting.

What is claimed is:

1. A camera system comprising:
    a camera body having a camera-body mount and a plurality of electric connection terminals which are aligned approximately around an optical axis and have their heights in the contacting direction of them arranged to have a stepped difference at least by one step; and
    an optical accessory having an optical-accessory mount which is arranged to be coupled with and detached from said camera-body mount by rotating around said optical axis and a plurality of electric connection terminals which are aligned approximately around the optical axis and have their heights in the contacting direction of them arranged to have a stepped difference at least by one step, so that said plurality of electric connection terminals of said optical accessory can be brought into contact with said plurality of electric connection terminals of said camera body when said camera-body mount is coupled with said optical-accessory mount by rotating said mounts relative to each other,
    wherein:
        at least one of two groups of said electric connection terminals is arranged to be movable in the contacting direction and to be elastically urged to move in the contacting direction;
        among each of two groups of said electric connection terminals, an electric connection terminal at a non-ground potential and an electric connection terminal at a ground level related to power supply are positioned away from each other with other electric connection terminals related to communication disposed between said electric connection terminals related to power supply;
        said stepped difference is set such that one of said electric connection terminals related to power supply which is located in a rear end part with respect to a direction of rotating said optical-accessory mount to be coupled with said camera-body mount is shifted in height in the contacting direction from said electric connection terminals related to communication and the other of said electric connection terminals related to power supply; and
    wherein said electric connection terminal at a non-ground potential is not adjacent to and differs in height from any electric connection terminal at a ground level.

2. A system according to claim 1, wherein said electric connection terminal related to power supply are arranged to have a greater contact pressure than said electric connection terminals related to communication.

3. A system according to claim 1, wherein said electric connection terminal shifted in height from said electric connection terminals related to communication by said stepped difference is a power supply terminal having a non-ground.

4. A system according to claim 2, wherein said electric connection terminal shifted in height from said electric connection terminals related to communication by said stepped difference is a power supply terminal having a non-ground.

5. A system according to claim 1, wherein the electric connection terminals of said camera body are disposed to be movable in the contacting direction and are elastically urged to move in the contacting direction.

6. A camera body having a camera-body mount which permits an optical accessory to be coupled with said camera body by rotating an accessory mount of said optical accessory around an optical axis, said optical accessory having a plurality of electric connection terminals which are aligned approximately around the optical axis and have their heights in the contacting direction of them arranged to have a stepped difference at least by one step, said camera body comprising:
    a plurality of electric connection terminals disposed in position to be in contact with said electric connection terminals of said optical accessory when said two mounts are coupled with each other by rotating them relative to each other, wherein:

said plurality of electric connection terminals of said camera body include an electric connection terminal at a non-ground potential and an electric connection terminal at a ground level related to power supply and disposed away from each other with the other electric connection terminals related to communication disposed between said electric connection terminals related to power supply; and one of said electric connection terminals related to power supply which is located in a rear end part with respect to a direction of rotating said accessory mount to be coupled with said camera-body mount is shifted in height in the contacting direction in such a way as to have a stepped difference from said electric connection terminals related to communication and the other of said electric connection terminals related to power supply; and wherein said electric connection terminal at a non-ground potential is not adjacent to and differs in height from any electric connection terminal at a ground level.

7. A camera body according to claim 6, wherein said plurality of electric connection terminals of said camera body are desired to be movable in the contacting direction and are elastically urged to move in the contacting direction.

8. A camera body according to claim 7, wherein said electric connection terminals related to power supply are arranged to have a greater contact pressure than said electric connection terminals related to communication.

9. A camera body according to claim 6, wherein said electric connection terminal shifted in height from said electric connection terminals related to communication by said stepped difference is a power supply terminal having a non-ground potential.

10. A camera body according to claim 7, wherein said electric connection terminal shifted in height from said electric connection terminals related to communication by said stepped difference is a power supply terminal having a non-ground potential.

11. A camera body according to claim 6, wherein said plurality of electric connection terminals of said camera body are carried by a contact holder.

12. A camera body according to claim 11, wherein said plurality of electric connection terminals of said camera body are carried by said contact holder in such a way as to be movable relative to said contact holder in the contacting direction and are urged by a plurality of urging members to move in the contacting direction.

13. A camera body according to claim 12, wherein said plurality of electric connection terminals related to power supply are arranged to be under a stronger urging force of said urging members than the other electric connection terminals.

14. A camera body according to claim 12, wherein said plurality of urging members are arranged to be used as electric conduction lines.

15. A camera body according to claim 11, further comprising an image sensor arranged to photo-electric convert an image of an object to be photographed, said image sensor being positioned in the rear of said contact holder in the direction of the optical axis in such a way as to have a peripheral part of said image sensor overlap a projected area of said contact holder in the optical axis direction.

16. A camera body according to claim 6, further comprising:

an image sensor for photo-electric converting an image of an object to be photographed;

a camera signal processing circuit for converting into a TV signal an image signal output from said image sensor:

a white balance adjustment circuit arranged to receive said TV signal;

a focusing circuit arranged to receive said TV signal;

an exposure control circuit arranged to receive said TV signal; and a control circuit arranged to supply communication data obtained from said plurality of circuits to said optical accessory through said camera-body electric connection terminals related to communication.

17. An optical accessory having an accessory mount which is detachably coupled with a camera-body mount by rotating said accessory mount around an optical axis relative to said camera-body mount in mounting said optical accessory on a camera-body, said camera body having a plurality of electric connection terminals which are aligned approximately around the optical axis and have their heights in the contacting direction of them arranged to have a stepped difference at least by one step, said optical accessory comprising:

a plurally of electric connection terminals disposed in position to be in contact with said plurality of electric connection terminals of said camera body when said two mounts are coupled with each other by rotating them relative to each other, wherein:

said plurality of electric connection terminals of said optical accessory include an electric connection terminal at a non-ground potential and an electric connection terminal at a ground level related to power supply and disposed away from each other with the other electric connection terminals related to communication disposed between said electric connection terminals related to power supply; and one of said electric connection terminals related to power supply which is located in a rear end part with respect to a direction of rotating said accessory mount to be coupled with said camera-body mount is shifted in height in the contacting direction in such a way as to have a stepped difference from said electric connection terminals related to communication and the other of said electric connection terminals related to power supply; and wherein said electric connection terminal at a non-ground potential is not adjacent to and differs in height from any electric connection terminal at a ground level.

18. An optical accessory according to claim 17, wherein said plurality of electric connection terminals of said camera body are disposed to be movable in the contacting direction and are elastically urged to move in the contacting direction.

19. An optical accessory according to claim 17, wherein said electric connection terminals related to power supply are arranged to have a greater contact pressure than said electric connection terminals related to communication.

20. An optical accessory according to claim 17, wherein said electric connection terminal shifted in height from said electric connection terminals related to communication by said stepped difference is a power supply terminal having a non-ground potential.

21. An optical accessory according to claim 18, wherein said electric connection terminal shifted in height from said electric connection terminals related to communication by said stepped difference is a power supply terminal having a non-ground potential.

22. An optical accessory according to claim 17, wherein said plurality of electric connection terminals of said optical accessory are carried by a contact holder.

23. An optical accessory according to claim 22, wherein said plurality of electric connection terminals of said optical accessory are fixedly carried by said contact holder.

24. An optical accessory according to claim 23, wherein the height of said plurality of electric connection terminals of said optical accessory is arranged to be approximately flush with the surface of said contact holder.

25. An optical accessory according to claim 23, wherein said contact holder has a stepped surface coinciding with the stepped difference in height of said plurality of electric connection terminals of said optical accessory.

26. An optical accessory according to claim 24, wherein said plurality of electric connection terminals of said optical accessory are inserted in said contact holder.

27. An optical accessory according to claim 17, further comprising:
   a first optical system related to focusing;
   a second optical system related to zooming;
   a first motor for moving said first optical system in the direction of the optical axis;
   a second motor for moving said second optical system in the direction of the optical axis;
   first detection means for detecting information on the position of said first optical system;
   second detection means for detecting information on the position of said second optical system; and
   a control circuit arranged to cause signals indicative of the position information detected by said first and second detection means to be supplied from said electric connection terminals related to communication to said camera body.

28. A camera body having a bayonet mount which can be detachably coupled with a bayonet mount of an optical accessory, comprising:
   a plurality of electric connection terminals aligned approximately around an optical axis, said plurality of electric connection terminals including first and second power supply terminals and a plurality of communication terminals which are disposed between said first and second power supply terminals, said first power supply terminal being of a non-ground potential and being arranged to be shifted in height in the contacting direction from said second power supply terminal, which is at a ground level, and said plurality of communication terminals, and said first power supply terminal being located in a rear end part with respect to a direction of rotating said bayonet mount of said optical accessory to be coupled with said bayonet mount of said camera body, wherein said first power supply terminal is not adjacent to and differs in height from any terminal at a ground level.

29. A camera body according to claim 28, wherein said plurality of electric connection terminals of said camera body are disposed to be movable in the contacting direction and are elastically urged to move in the contacting direction.

30. A camera body according to claim 29, wherein said first and second power supply terminals are arranged to have a greater contact pressure than said communication terminals.

31. A camera body according to claim 28, wherein said first power supply terminal has a high potential while said second power supply terminal is arranged to be at a ground level.

32. A camera body according to claim 30, wherein said first power supply terminal has a high potential while said second power supply terminal is arranged to be at a ground level.

33. A camera body according to claim 28, wherein said plurality of electric connection terminals of said camera body are carried by a contact holder.

34. A camera body according to claim 33, wherein said plurality of electric connection terminals of said camera body are carried by said contact holder in such a way as to be movable relative to said contact holder in the contacting direction and are urged by a plurality of urging members to move in the contacting direction.

35. A camera body according to claim 34, wherein said first and second power supply terminals are arranged to be under a greater urging force of said urging members than said communication terminals.

36. A camera body according to claim 34, wherein said plurality of urging members are arranged to be used as electric conduction lines.

37. A camera body according to claim 33, further comprising an image sensor arranged to photo-electric convert an image of an object to be photo-graphed, said image sensor being positioned in the rear of said contact holder in the direction of the optical axis in such a way as to have a peripheral part of said image sensor overlap a projected area of said contact holder in the optical axis direction.

38. A camera body according to claim 28, further comprising:
   an image sensor for photo-electric converting an image of an object to be photographed;
   a camera signal processing circuit for converting into a TV signal an image signal output from said image sensor;
   a white balance adjustment circuit arranged to receive said TV signal;
   a focusing circuit arranged to receive said TV signal;
   an exposure control circuit arranged to receive said TV signal; and
   a control circuit arranged to supply communication data obtained from said plurality of circuits to said optical accessory through said camera-body electric connection terminals related to communication.

39. An optical accessory having a bayonet mount which can be detachably coupled with a bayonet mount of a camera body, comprising:
   a plurality of electric connection terminals aligned approximately around an optical axis, said plurality of electric connection terminals including first and second power supply terminals and a plurality of communication terminals, said communication terminals being disposed between said first and second power supply terminals, said first power supply terminal being at a non-ground potential and being arranged to be shifted in height in the contacting direction from said second power supply terminal, which is at a ground level, and said plurality of communication terminals, and said first power supply terminal being located in a rear end part with respect to a direction of rotating said bayonet mount of said optical accessory to be coupled with said bayonet mount of said camera body, wherein said first power supply terminal is not adjacent to and differs in height from any terminal at a ground level.

40. An optical accessory according to claim 39, wherein said plurality of electric connection terminals of said camera body are carried to be movable in the contacting direction and are elastically urged to move in the contacting direction.

41. An optical accessory according to claim 40, wherein said first and second power supply terminals are arranged to have a greater contact pressure than said communication terminals.

42. A optical accessory according to claim 39, wherein said first power supply terminal has a high potential while said second power supply terminal is arranged to be at a ground level.

43. An optical accessory according to claim 41, wherein said first power supply terminal has a high potential while said second power supply terminal is arranged to be at a ground level.

44. An optical accessory according to claim 39, wherein said plurality of electric connection terminals of said optical accessory are carried by a contact holder.

45. An optical accessory according to claim 44, wherein said plurality of electric connection terminals of said optical accessory are fixedly carried by said contact holder.

46. An optical accessory according to claim 45, wherein the height of said plurality of electric connection terminals of said optical accessory is arranged to be approximately flush with the surface of said contact holder.

47. An optical accessory according to claim 45, wherein said contact holder has a stepped surface coinciding with the stepped difference in height of said plurality of electric connection terminals of said optical accessory.

48. An optical accessory according to claim 46, wherein said plurality of electric connection terminals of said optical accessory are inserted in said contact holder.

49. An optical accessory according to claim 39, further comprising:
 a first optical system related to focusing;
 a second optical system related to zooming;
 a first motor for moving said first optical system in the direction of the optical axis;
 a second motor for moving said second optical system in the direction of the optical axis;
 first detection means for detecting information on the position of said first optical system;
 second detection means for detecting information on the position of said second optical system; and
 a control circuit arranged to cause signals indicative of the position information detected by said first and second detection means to be supplied from said electric connection terminals related to communication to said camera body.

50. A camera body having a bayonet mount which can be detachably coupled with a bayonet mount of an optical accessory, comprising:
 a plurality of electric connection terminals aligned approximately around an optical axis, said plurality of electric connection terminals including first and second power supply terminals and a plurality of communication terminals which are disposed between said first and second power supply terminals, said first power supply terminal being at a non-ground potential and being arranged to be shifted in height in the contacting direction from said second power supply terminal, which is at a ground level, and said plurality of communication terminals, wherein said first power supply terminal is not adjacent to and differs in height from any terminal at a ground level.

51. A camera body according to claim 50, wherein said plurality of electric connection terminals of said camera body are carried to be movable in the contacting direction and are elastically urged to move in the contacting direction.

52. A camera body according to claim 51, wherein said first and second power supply terminals are arranged to have a greater contact pressure than said communication terminals.

53. A camera body according to claim 50, wherein said first power supply terminal has a high potential while said second power supply terminal is arranged to be at a ground level.

54. A camera body according to claim 52, wherein said first power supply terminal has a high potential while said second power supply terminal is arranged to be at a ground level.

55. A camera body according to claim 50, wherein said plurality of electric connection terminals of said camera body are carried by a contact holder.

56. A camera body according to claim 55, wherein said plurality of electric connection terminals of said camera body are carried by said contact holder in such a way as to be movable relative to said contact holder in the contacting direction and are urged by a plurality of urging members to move in the contacting direction.

57. A camera body according to claim 56, wherein said first and second power supply terminals are arranged to be under a greater urging force of said urging members than said communication terminals.

58. A camera body according to claim 56, wherein said plurality of urging members are arranged to be used as electric conduction lines.

59. A camera body according to claim 55, further comprising an image sensor arranged to photo-electric convert an image of an object to be photo-graphed, said image sensor being positioned in the rear of said contact holder in the direction of the optical axis in such a way as to have a peripheral part of said image sensor overlap a projected area of said contact holder in the optical axis direction.

60. A camera body according to claim 50, further comprising:
 an image sensor for photo-electric converting an image of an object to be photographed;
 a camera signal processing circuit for converting into a TV signal an image signal output from said image sensor;
 a white balance adjustment circuit arranged to receive said TV signal;
 a focusing circuit arranged to receive said TV signal;
 an exposure control circuit arranged to receive said TV signal; and a control circuit arranged to supply communication data obtained from said plurality of circuits to said optical accessory through said camera-body electric connection terminals related to communication.

61. An optical accessory having a bayonet mount which can be detachably coupled with a bayonet mount of a camera body, comprising:

a plurality of electric connection terminals aligned approximately around an optical axis, said plurality of electric connection terminals including first and second power supply terminals and a plurality of communication terminals, said communication terminals being disposed between said first and second power supply terminals, said first power supply terminal being at a non-ground potential and being arranged to be shifted in height in the contacting direction from said second power supply terminal, which is at aground level, and said plurality of communication terminals, wherein said first power supply terminal is not adjacent to and differs in height from any terminal at a ground level.

62. An optical accessory according to claim 61, wherein said plurality of electric connection terminals of said camera body are carried to be movable in the contacting direction and are elastically urged to move in the contacting direction.

63. An optical accessory according to claim 62, wherein said first and second power supply terminals are arranged to have a greater contact pressure than said communication terminals.

64. A optical accessory according to claim 61, wherein said first power supply terminal has a high potential while said second power supply terminal is arranged to be at a ground level.

65. An optical accessory according to claim 63, wherein said first power supply terminal has a high potential while said second power supply terminal is arranged to be at a ground level.

66. An optical accessory according to claim 61, wherein said plurality of electric connection terminals of said optical accessory are carried by a contact holder.

67. An optical accessory according to claim 66, wherein said plurality of electric connection terminals of said optical accessory are fixedly carried by said contact holder.

68. An optical accessory according to claim 67, wherein the height of said plurality of electric connection terminals of said optical accessory is arranged to be approximately flush with the surface of said contact holder.

69. An optical accessory according to claim 67, wherein said contact holder has a stepped surface coinciding with the stepped difference in height of said plurality of electric connection terminals of said optical accessory.

70. An optical accessory according to claim 68, wherein said plurality of electric connection terminals of said optical accessory are inserted in said contact holder.

71. An optical accessory according to claim 61, further comprising:

a first optical system related to focusing;
a second optical system related to zooming;
a first motor for moving said first optical system in the direction of the optical axis;
a second motor for moving said second optical system in the direction of the optical axis;
first detection means for detecting information on the position of said first optical system;
second detection means for detecting information on the position of said second optical system; and
a control circuit arranged to cause signals indicative of the position information detected by said first and second detection means to be supplied from said electric connection terminals related to communication to said camera body.

* * * * *

UNITED STATES PATENT AND TRADEMARK OFFICE
CERTIFICATE OF CORRECTION

PATENT NO. : 5,021,812

DATED : June 4, 1991

INVENTOR(S) : Takahiro KOHNO, et al.

It is certified that error appears in the above-identified patent and that said Letters Patent is hereby corrected as shown below:

COLUMN 1:

Line 39, "tires" should read --times--.
    Line 46, "direction" should read --direction.--

COLUMN 2:

Line 32, "and" should be deleted.

COLUMN 3:

Line 40, "less" should read --lesser--.

COLUMN 4:

Line 49, "never" should read --can never--.

COLUMN 5:

Line 30, "etc.." should read --etc.--.

UNITED STATES PATENT AND TRADEMARK OFFICE
CERTIFICATE OF CORRECTION

PATENT NO. : 5,021,812

DATED : June 4, 1991

INVENTOR(S) : Takahiro KOHNO, et al.

It is certified that error appears in the above-identified patent and that said Letters Patent is hereby corrected as shown below:

COLUMN 7:

Line 11, "position" should read --position.--.
    Line 21, "advantages" should read --advantage--.
    Line 38, "is" should read --are--.

COLUMN 8:

Line 38, "terminal" should read --terminals--.
    Line 45, "non-ground." should read --non-ground potential.--.
    Line 50, "non-ground." should read --non-ground potential.--.
    Line 65, "position" should read --a position--.

COLUMN 9:

Line 24, "desired" should read --disposed--.

COLUMN 10:

Line 26, "plurally" should read --plurality--.
    Line 27, "position" should read --a position--.

COLUMN 12:

Lines 8-11, Claim 31 should be deleted.
    Lines 12-15, Claim 32 should be deleted.
    Line 34, "photo-graphed" should read --photographed--.

UNITED STATES PATENT AND TRADEMARK OFFICE
CERTIFICATE OF CORRECTION

PATENT NO. : 5,021,812

DATED : June 4, 1991

INVENTOR(S) : Takahiro KOHNO, et al.

It is certified that error appears in the above-identified patent and that said Letters Patent is hereby corrected as shown below:

COLUMN 13:

Line 13, "carried" should read --disposed--.
    Lines 20-23, Claim 42 should be deleted.
    Line 24-27, Claim 43 should be deleted.

COLUMN 14:

Line 17, "carried" should read --disposed--.
    Lines 24-27, Claim 53 should be deleted.
    Lines 28-31, Claim 54 should be deleted.
    Line 51, "photo-graphed" should read --photographed--.

COLUMN 15:

Line 19, "aground" should read --a ground--.
    Line 25, "carried" should read --disposed--.
    Lines 32-35, Claim 64 should be deleted.
    Lines 36-39, Claim 65 should be deleted.

Signed and Sealed this

Twenty-ninth Day of June, 1993

Attest:

*Attesting Officer*

MICHAEL K. KIRK

*Acting Commissioner of Patents and Trademarks*